(12) United States Patent
Li et al.

(10) Patent No.: US 12,260,540 B2
(45) Date of Patent: Mar. 25, 2025

(54) MATERIAL COMPLETENESS DETECTION METHOD AND APPARATUS, AND STORAGE MEDIUM

(71) Applicant: ZHENGZHOU UNIVERSITY OF LIGHT INDUSTRY, Zhengzhou (CN)

(72) Inventors: Hao Li, Zhengzhou (CN); Xinyu Yan, Zhengzhou (CN); Gen Liu, Zhengzhou (CN); Haoqi Wang, Zhengzhou (CN); Zhongshang Zhai, Zhengzhou (CN); Bing Li, Zhengzhou (CN); Yuyan Zhang, Zhengzhou (CN); Yan Liu, Zhengzhou (CN)

(73) Assignee: ZHENGZHOU UNIVERSITY OF LIGHT INDUSTRY, Zhengzhou (CN)

( * ) Notice: Subject to any disclaimer, the term of this patent is extended or adjusted under 35 U.S.C. 154(b) by 413 days.

(21) Appl. No.: 17/749,195

(22) Filed: May 20, 2022

(65) Prior Publication Data

US 2023/0377123 A1    Nov. 23, 2023

(51) Int. Cl.
*G06T 7/00* (2017.01)
*G05B 19/418* (2006.01)
*G06V 10/82* (2022.01)

(52) U.S. Cl.
CPC ...... *G06T 7/0008* (2013.01); *G05B 19/41875* (2013.01); *G06V 10/82* (2022.01); *G05B 2219/32335* (2013.01); *G06T 2200/24* (2013.01); *G06T 2207/20084* (2013.01)

(58) Field of Classification Search
CPC ............ G06T 7/0008; G06T 2200/24; G06T 2207/20084; G06T 2207/20081; G06T 2207/30164; G05B 19/41875; G05B 2219/32335; G05B 2219/32178; G06V 10/82; G06V 10/811; G06V 2201/06
See application file for complete search history.

(56) References Cited

U.S. PATENT DOCUMENTS 7,203,147 B2    4/2007   Kawakami et al.
7,852,597 B2   12/2010   Shirai
9,195,169 B2   11/2015   Kishida

FOREIGN PATENT DOCUMENTS

CN        113240798 A  *  8/2021  ........... G06K 9/3233

* cited by examiner

*Primary Examiner* — Hwa Andrew Lee
(74) *Attorney, Agent, or Firm* — True Shepherd LLC; Andrew C. Cheng

(57) ABSTRACT

A material completeness detection method configured to detect whether materials of a target object in a physical production line are complete, includes: inputting an image of the target object in the physical production line into a material completeness detection algorithm to acquire a first detection result; inputting a virtual model of the target object in a virtual production line into the material completeness detection algorithm to acquire a second detection result, where the virtual production line is a DT of the physical production line; and acquiring a material completeness detection result of the target object based on the first detection result and the second detection result. The embodiments of the present disclosure can realize efficient and accurate material completeness detection.

7 Claims, 4 Drawing Sheets

MATERIAL COMPLETENESS DETECTION METHOD AND APPARATUS, AND STORAGE MEDIUM

TECHNICAL FIELD

The present disclosure relates to the technical field of material detection, and in particular to a material completeness detection method and apparatus, and a storage medium.

BACKGROUND ART

In the automatic assembly or welding line, each plate is subjected to material completeness detection before assembly or welding, so as to determine whether the plate is missing parts such as screws, nuts, bolts, and positioning pins. The material completeness detection is done manually, thereby resulting in low detection efficiency and accuracy. Therefore, it is necessary to improve the existing technology.

SUMMARY

In order to achieve efficient and accurate material completeness detection, the present disclosure provides a material completeness detection method and apparatus, and a storage medium.

An embodiment of the present disclosure provides a material completeness detection method, for detecting whether materials of a target object in a physical production line are complete, and including: inputting an image of the target object in the physical production line into a material completeness detection algorithm to acquire a first detection result; inputting a virtual model of the target object in a virtual production line into the material completeness detection algorithm to acquire a second detection result, where the virtual production line is a digital twin (DT) of the physical production line; and acquiring a material completeness detection result of the target object based on the first detection result and the second detection result.

In an implementation, in the step of acquiring a material completeness detection result of the target object based on the first detection result and the second detection result, when either of the first detection result and the second detection result indicates that the materials of the target object are incomplete, the material completeness detection result may include that the materials of the target object are incomplete; and when both the first detection result and the second detection result indicate that the materials of the target object are complete, the material completeness detection result may include that the materials of the target object are complete.

In an implementation, the method further may include: controlling the physical production line to transfer the target object to an unqualified zone when the material completeness detection result includes that the materials of the target object are incomplete.

In an implementation, the method further may include: controlling the physical production line to convey the target object to a next process when the material completeness detection result includes that the materials of the target object are complete.

In an implementation, when the material completeness detection result includes that the materials of the target object are incomplete, the material completeness detection result further may include a type and/or a position of a missing material.

In an implementation, the material completeness detection algorithm may include a backbone feature extraction network, configured to receive the image, and extract a backbone feature of the image to generate a 160*160 feature layer, an 80*80 feature layer, a 40*40 feature layer, and a 20*20 feature layer; an enhanced feature extraction network, configured to extract an enhanced feature from the input 160*160 feature layer, 80*80 feature layer, 40*40 feature layer and 20*20 feature layer to generate a 160*160*128 enhanced feature layer, an 80*80*256 enhanced feature layer, a 40*40*512 enhanced feature layer, and a 20*20*1,024 enhanced feature layer; and an output network, configured to output a detection result based on the 160*160*128 enhanced feature layer, the 80*80*256 enhanced feature layer, the 40*40*512 enhanced feature layer, and the 20*20*1,024 enhanced feature layer.

In an implementation, the enhanced feature extraction network may generate the 160*160*128 enhanced feature layer by performing the following operations on the 20*20 feature layer in sequence: up-sampling, connection with the 40*40 feature layer, feature extraction, up-sampling, connection with the 80*80 feature layer, feature extraction, up-sampling, connection with the 160*160 feature layer, and feature extraction.

In an implementation, the method further may include: establishing a three-dimensional (3D) model of the physical production line and the materials in advance, and generating the DT of the physical production line according to the established 3D model.

In an implementation, the method further may include: displaying the virtual production line and the material completeness detection result in a graphical user interface (GUI).

An embodiment of the present disclosure provides a material completeness detection apparatus, for detecting whether materials of a target object in a physical production line are complete, and including: a first detection module configured to input an image of the target object in the physical production line into a material completeness detection algorithm to acquire a first detection result; a second detection module configured to input a virtual model of the target object in a virtual production line into the material completeness detection algorithm to acquire a second detection result, where the virtual production line is a DT of the physical production line; and a processing module configured to acquire a material completeness detection result of the target object based on the first detection result and the second detection result.

An embodiment of the present disclosure further provides a computer-readable storage medium. The computer-readable storage medium stores a computer program, where the computer program is executed by a processor to implement the above material completeness detection method.

The embodiments of the present disclosure have the following beneficial effects:

The embodiments of the present disclosure propose the material completeness detection algorithm by combining the digital twin (DT) technology and the deep learning (DL) technology. The material completeness detection algorithm simultaneously detects the material completeness of the target object in the physical production line and the virtual model of the target object in the virtual production line of the physical production line. It finally determines the material completeness of the target object based on the two detection results. In this way, the embodiments of the present disclosure can realize efficient and accurate material completeness detection.

DETAILED DESCRIPTION OF THE EMBODIMENTS

Figure 1:
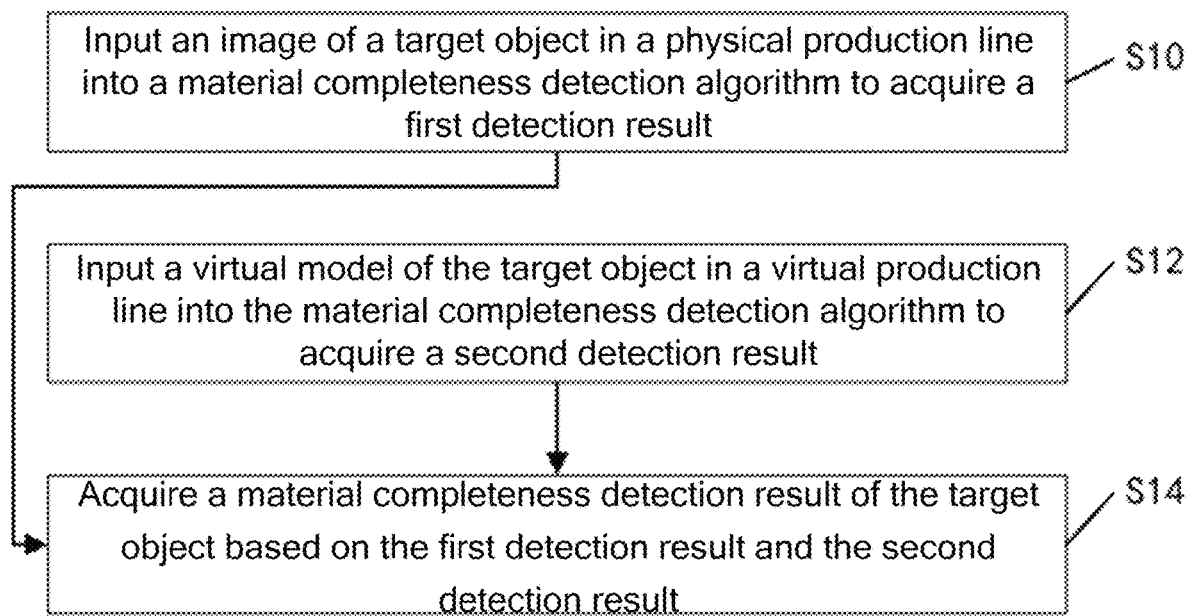
FIG. 1 is a flowchart of a material completeness detection method according to an embodiment of the present disclosure.

To make the to-be-resolved technical problems, the technical solutions, and the beneficial effects of the present disclosure clearer, the present disclosure is described in further detail below with reference to the drawings and embodiments. It should be understood that the specific embodiments described herein are merely intended to explain the present disclosure, rather than to limit the present disclosure.

In the following description of the present disclosure, the terms such as "module", "component" and "unit" used to represent elements are only for convenience of description, and have no specific meaning themselves. Thus, "module", "component" and "unit" may be used interchangeably.

It should be noted that terms such as "first" and "second" in the specification, claims and drawings of the present disclosure are intended to distinguish between similar objects but do not necessarily indicate a specific order or sequence.

In order to solve the problem of low efficiency and low accuracy in manual material completeness detection in the production line, an embodiment of the present disclosure proposes a material completeness detection solution by combining the digital twin (DT) technology and the deep learning (DL) technology.

Specifically, the embodiment of the present disclosure is applicable to scenarios where it is necessary to detect whether the materials of the plates (target objects to be detected) in the production line are complete. For example, in production lines that require plate assembly or welding, before assembly or welding, each plate needs to be detected to determine whether there is a lack of small parts (screws, nuts, bolts, positioning pins, etc.) on the plate. The detection aims to detect and deal with the plate with incomplete materials in time, so as to improve assembly or welding efficiency and avoid unnecessary rework or quality problems.

The DT technology and DL technology are advanced digital and intelligent technologies. The DT technology can achieve a high degree of integration of various types of specific physical information. Models established using the DT technology can receive various source data from physical objects and feed the results back to the physical objects. The DT technology can display the real environment in the virtual model, and control the physical objects in the virtual model to realize the combination of virtual and real. The DL technology is an efficient method for fast and uninterrupted learning. The detection efficiency of the DL technology is much higher than that of manual detection, and its detection error rate after training on large-scale data sets is much lower than that of manual detection. In addition, the DL technology has extremely high detection speed. By establishing DL algorithms for specific objects, the detection efficiency and accuracy can be further improved.

Therefore, the embodiment of the present disclosure proposes the material completeness detection solution by combining the DT technology and the DL technology, so as to improve the efficiency and accuracy of material completeness detection in the production line. The embodiment of the present disclosure will be described below with reference to the drawings. The embodiments of the present disclosure are described below with reference to the drawings.

FIG. 1 is a flowchart of a material completeness detection method according to an embodiment of the present disclosure. The method can be used to detect whether materials (e.g., screws, nuts, bolts, positioning pins, etc.) on a target object (e.g., plate) in a production line are complete. As shown in FIG. 1, the method includes the following steps:

S10. Input an image of a target object in a physical production line into a material completeness detection algorithm to acquire a first detection result.

S12. Input a virtual model of the target object in a virtual production line into the material completeness detection algorithm to acquire a second detection result.

In Step S12, the virtual production line is a DT of the physical production line.

S14. Acquire a material completeness detection result of the target object based on the first detection result and the second detection result.

When either of the first detection result and the second detection result indicates that materials of the target object are incomplete, the material completeness detection result includes that the materials of the target object are incomplete. When both the first detection result and the second detection result indicate that the materials of the target object are complete, the material completeness detection result includes that the materials of the target object are complete. That is, only when both the detection results of the physical production line and the virtual production line indicate that the materials of the target object are complete, the materials of the target object are considered complete. In this way, the detection accuracy is improved.

In addition, when the material completeness detection result includes that the materials of the target object are incomplete, the material completeness detection result further includes a type and/or a position of a missing material.

The embodiment of the present disclosure proposes the material completeness detection algorithm by combining the DT technology and the DL technology. The material completeness detection algorithm simultaneously detects the material completeness of the target object in the physical production line and the virtual model of the target object in the virtual production line of the physical production line. It finally determines the material completeness of the target object based on the two detection results.

The material completeness detection algorithm is described below.

Figure 2:
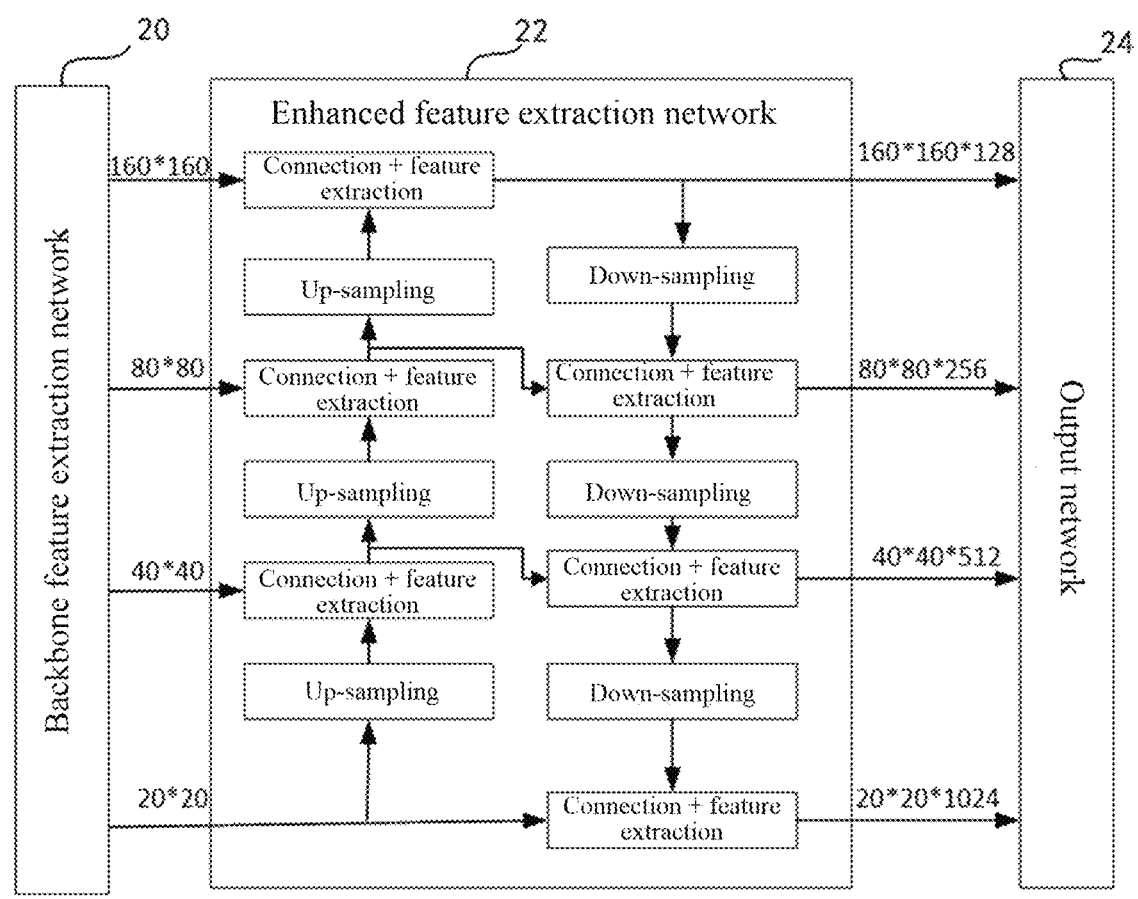
FIG. 2 is a schematic view of a material completeness detection algorithm according to the present disclosure.

The material completeness detection algorithm used in Steps S10 and S12 may be, for example, a YOLOX target detection algorithm. Further, an embodiment of the present disclosure proposes an improved YOLOX target detection algorithm to enhance the sensitivity of the material completeness detection algorithm to small or tiny components, thereby further improving the detection effect. Specifically, as shown in FIG. 2, the material completeness detection algorithm of the embodiment of the present disclosure structurally includes: a backbone feature extraction network 20, an enhanced feature extraction network 22, and an output network 24.

The backbone feature extraction network 20 is configured to receive the image (such as an image of a plate), and extract a backbone feature of the image to generate a 160*160 feature layer, an 80*80 feature layer, a 40*40 feature layer, and a 20*20 feature layer. The backbone feature extraction network may be implemented based on a residual network.

The enhanced feature extraction network 22 is configured to extract an enhanced feature from the input 160*160 feature layer, 80*80 feature layer, 40*40 feature layer and 20*20 feature layer to generate a 160*160*128 enhanced feature layer, an 80*80*256 enhanced feature layer, a 40*40*512 enhanced feature layer, and a 20*20*1,024 enhanced feature layer.

The output network 24 is configured to output a detection result based on the 160*160*128 enhanced feature layer, the 80*80*256 enhanced feature layer, the 40*40*512 enhanced feature layer, and the 20*20*1,024 enhanced feature layer. For example, the output network 24 may analyze the 160*160*128 enhanced feature layer, the 80*80*256 enhanced feature layer, the 40*40*512 enhanced feature layer, and the 20*20*1,024 enhanced feature layer, respectively, to acquire four detection results, and determine a material completeness detection result based on the four detection results. Each of the four detection results may include three parameters, which are configured to indicate whether a material is included, a type of the material, and coordinates of the material.

In the embodiment of FIG. 2, the enhanced feature network 22 introduces up-sampling from the 80*80 feature layer to the 160*160 feature layer, so as to output the 160*160*128 enhanced feature layer. This design avoids affecting the feature extraction, and improves the sensitivity to small and medium targets.

Specifically, as shown in FIG. 2, the enhanced feature network 22 generates the 160*160*128 enhanced feature layer by performing the following operations on the 20*20 feature layer in sequence: up-sampling, connection with the 40*40 feature layer, feature extraction, up-sampling, connection with the 80*80 feature layer, feature extraction, up-sampling, connection with the 160*160 feature layer, and feature extraction.

Similarly, as shown in FIG. 2, the 80*80*256 enhanced feature layer is generated by performing the following operations on the 20*20 feature layer in sequence: generating first data by up-sampling, connection with the 40*40 feature layer, feature extraction, up-sampling, and connection with the 80*80 feature layer; and connecting the first data with down-sampled data of the 60*160*128 enhanced feature layer, and performing feature extraction.

The 40*40*512 enhanced feature layer is generated by performing the following operations on the 20*20 feature layer in sequence: generating second data by up-sampling, connection with the 40*40 feature layer, and feature extraction; and connecting the second data with down-sampled data of the 80*80*256 enhanced feature layer, and performing feature extraction.

The 20*20*1,024 enhanced feature layer is generated by connecting the 20*20 feature layer with down-sampled data of the 40*40*512 enhanced feature layer, and performing feature extraction.

Referring to FIG. 2, the material completeness detection algorithm of the embodiment of the present disclosure is introduced. The improved YOLOX target detection algorithm improves the sensitivity to small and medium targets, and it is very suitable for detecting the missing of small parts such as screws, nuts, bolts or positioning pins of the plate.

It should be noted that after the material completeness detection algorithm is established, it needs to be trained so as to accurately detect whether the material is complete. The training process of the algorithm is described below.

First, a data set of complete and incomplete materials is created. After the target materials to be detected are determined, multiple pieces of different types of defective and non-defective materials are held by a fixture, and videos are recorded from multiple angles and changes. Then, the videos are input into a frame-taking program, and a path is entered to save images. An image is captured every 5 frames per second (FPS), and the data set is annotated with a data set annotation tool. The small parts to be detected are marked on the image, and an extensive markup language (XML) file including the position coordinates and types of each part is acquired.

Secondly, the prepared data set of complete and incomplete materials is input into the established neural network detection algorithm for multiple iterations of training. Specifically, the prepared data set of complete and incomplete materials is randomly divided into a training set and a test set according to a ratio of, for example, 9:1. The training set is used to train the model, and the test set is used to verify the accuracy of the model. Pre-trained weights are imported, and the training set is input into the DL detection algorithm for training. The input image is preprocessed. The images are edited in the format of (batch, channel, size), and are converted to a tensor type that can be trained in the neural network. The batch of the training images is selected according to the different computing power. The results after training are tested on the test set. Finally, the model acquired after many iterations of training is saved.

The embodiments of the present disclosure are described in detail with reference to FIGS. 1 and 2, and the operation of the present disclosure in a real scenario is described below with reference to FIG. 3.

Figure 3:
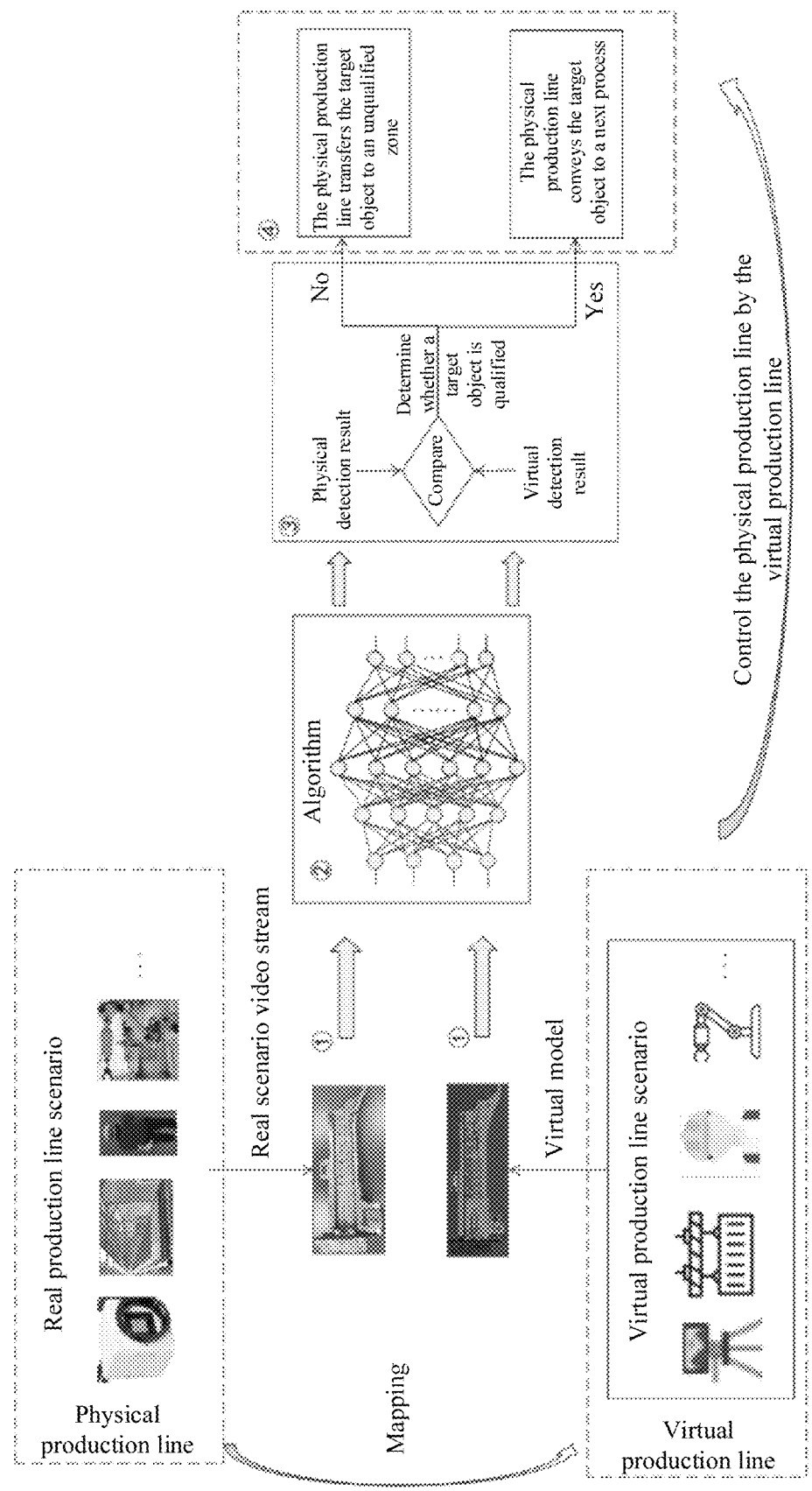
FIG. 3 is a schematic view of operation of the material completeness detection method according to the present disclosure.

As shown in FIG. 3, through the DT technology, the real scenario in the physical production line is completely mapped to the DT. As shown in the figure, cameras, conveyors, workers, and robotic arms on the physical site are mapped to the virtual production line.

Step 1: The real scenario video stream of the plate in the physical production line and the virtual model of the plate in the virtual production line are acquired, processed (processed into data that can be put into network detection), and input into the material completeness detection algorithm.

Step 2: The material completeness detection algorithm is operated to detect the material completeness of the plate in the real site and virtual production line.

Step 3: According to real and virtual detection results, it is determined whether the plate is qualified, that is, whether the materials are complete. Specifically, when either of the real and virtual detection result indicates that the materials are incomplete, it is determined that the plate is unqualified.

Step 4: When the plate is unqualified, the physical production line is controlled to transfer the plate to an unqualified zone; and otherwise, the physical production line is controlled to convey the plate to a next process.

In the above scenario, the virtual production line and the material completeness detection results may be displayed in a graphical user interface (GUI) for a user to observe and review.

The following is an example to illustrate how to establish a material completeness detection solution in the embodiment of the present disclosure.

First, the DT technology is used to establish a DT of a physical production line.

This process may be, for example, establishing a three-dimensional (3D) model of the physical production line and the materials in advance, and generating the DT of the physical production line according to the established 3D model. Specifically, the 3D model of the physical production line is established by using digital modeling software. In order to make the model close to the real effect, UG or PROE drawing software is used to perform 3D modeling of fixtures, normal plates, plates with various defects, robotic arms, conveyor belts, etc. The established 3D model is imported into digital simulation software to design a virtual production line. According to completeness detection requirements, the 3D models of the robotic arms, fixtures, clamps, conveyor belts, etc. established with UG or PROE are imported into the process simulation software. Then, the following parameters are set in the established virtual production line: the angle and position of the robotic arm to be moved, the state parameters of the tightening and loosening of the fixture, the strength of the clamp, and the transmission speed of the conveyor belt, etc. Thus, the virtual production line is formed for material completeness detection.

Secondly, a 3D model of a detection platform is established in the digital modeling software, and the model is imported into the Unity3D software for model rendering. A corresponding scenario is designed, and the scenario is embedded into the complete production line model. Then, a user interface (UI) page that display in real time is established in the established model to display the detection screen and results in real time. Page design is performed through the designer tool in Pyqt5. The required components such as buttons, labels, text boxes, etc. are first added, and then a horizontal or vertical layout is added to each component from the inside out. The designed page is converted into a program file, and various event functions are added in the program file through operations similar to pushButton.clicked.connect(self), so as to control the start and pause functions of the detection.

Third, a detection program (such as the material completeness detection algorithm) is embedded into a detection module of the constructed DT system. The physical production line in the DT detection module is connected. In the DT system, according to the real-time display information on the UI page, when the start button is clicked, and a physical detection device starts detection. When the pause button is clicked, the corresponding physical detection device paused. In this way, the combination of virtual and real is realized.

After the material completeness detection is started on the UI interface, real-time detection is performed in the physical production line. When the plate is detected, the detected plate information is transmitted to the virtual production line. In the DT system, the prepared plate model is imported into the virtual production line.

The material completeness detection is carried out together in the physical production line and the virtual production line. When it is detected that there is a problem with the plate in the virtual production line, the defect information of the plate is acquired, and transmitted to the real production line. The detection of the physical production line is immediately stopped, and the material is released from the fixture and transferred to the unqualified zone for manual re-detection.

In addition, the entire real-time image captured by the camera can be displayed in the DT system. Whether some parts are missing at each point will be displayed on the screen, and corresponding prompt information will be given on the detection page. There are also significant information statistics next to the detection window, including whether it is a specific part and whether the physical object is qualified. Therefore, the information can be integrated and analyzed in a timely manner.

The material completeness detection method and related applications according to the embodiments of the present disclosure are described in detail above, and the material completeness detection apparatus according to the embodiments of the present disclosure will be described below. Since many details of the material completeness detection solution are described above, in the following embodiments, only a general description is given, and details are not repeated.

Figure 4:
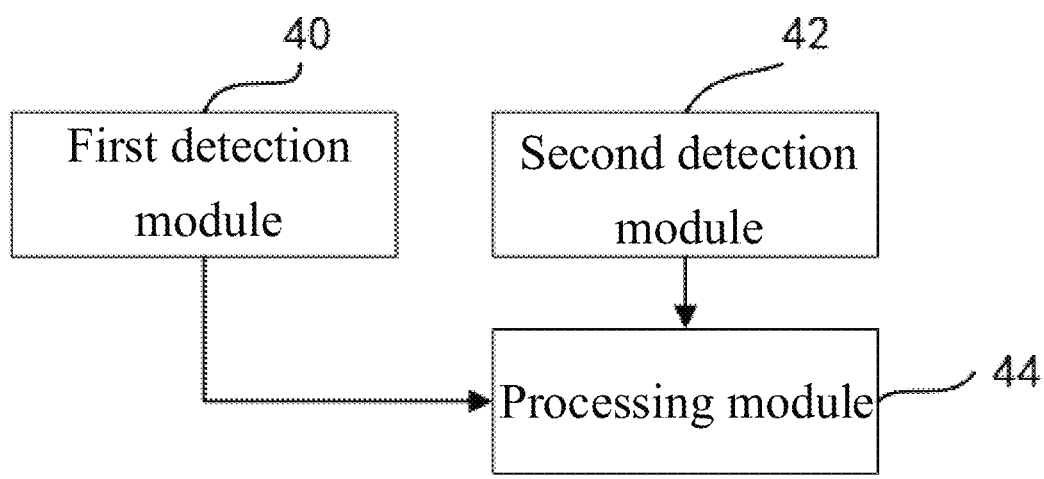
FIG. 4 is a structural view of a material completeness detection apparatus according to an embodiment of the present disclosure.

Specifically, FIG. 4 is a structural diagram of a material completeness detection apparatus according to an embodiment of the present disclosure. The material completeness detection apparatus includes a first detection module 40 configured to input an image of a target object in a physical production line into a material completeness detection algorithm to acquire a first detection result; a second detection module 42 configured to input a virtual model of the target object in a virtual production line into the material completeness detection algorithm to acquire a second detection result, where the virtual production line is a DT of the physical production line; and a processing module 44 configured to acquire a material completeness detection result of the target object based on the first detection result and the second detection result.

In addition, an embodiment of the present disclosure further provides a computer-readable storage medium. The computer-readable storage medium stores a computer program, where the computer program is executed by a processor to implement the above material completeness detection method.

It should be noted that terms "including", "comprising" or any other variants thereof are intended to cover non-exclusive inclusions, such that a process, method, article or system including a series of elements includes not only those elements but also other elements not explicitly listed, or elements inherent to such a process, method, article or system. Without further limitation, an element qualified by the phrase "including a . . . " does not exclude the presence of an additional identical element in the process, method, article or system including the element.

The serial numbers of the embodiments of the present disclosure are merely for description and do not represent a preference of the embodiments.

By means of the above description of the embodiments, those skilled in the art can clearly understand that the above method in the embodiments may be implemented by means of software and a necessary general-purpose hardware platform. Certainly, the hardware may be used, but the former is a better implementation manner in many cases. Based on this understanding, the technical solution of the present disclosure essentially, or a part contributing to the prior art, may be embodied in a form of a software product. The computer software product is stored on a storage medium (such as a read only memory (ROM)/random access memory (RAM), a magnetic disk, an optical disk), and includes several instructions to enable a terminal device (may be a mobile phone, a computer, a server, or a network device) to execute the method according to each embodiment of the present disclosure.

The above is merely a favorable embodiment of the present disclosure and does not constitute a limitation on the patent scope of the present disclosure. Any equivalent structure or equivalent process change made by using the specification and the drawings of the present disclosure, or direct or indirect application thereof in other related technical fields, should still fall in the protection scope of the patent of the present disclosure.

What is claimed is:

1. A material completeness detection method, for detecting whether materials of a target object in a physical production line are complete, comprising:
   inputting an image of the target object into a material completeness detection algorithm to acquire a first detection result;
   inputting a virtual model of the target object in a virtual production line into the material completeness detection algorithm to acquire a second detection result, wherein the virtual production line is a digital twin (DT) of the physical production line; and
   acquiring a material completeness detection result of the target object based on the first detection result and the second detection result;
   the material completeness detection algorithm comprises:
   a backbone feature extraction network, configured to receive the image, and extract a backbone feature of the image to generate a 160*160 feature layer, an 80*80 feature layer, a 40*40 feature layer, and a 20*20 feature layer;
   an enhanced feature extraction network, configured to extract an enhanced feature from the input 160*160 feature layer, 80*80 feature layer, 40*40 feature layer and 20*20 feature layer to generate a 160*160*128 enhanced feature layer, an 80*80*256 enhanced feature layer, a 40*40*512 enhanced feature layer, and a 20*20*1,024 enhanced feature layer; and
   an output network, configured to output a detection result based on the 160*160*128 enhanced feature layer, the 80*80*256 enhanced feature layer, the 40*40*512 enhanced feature layer, and the 20*20*1,024 enhanced feature layer;
   the material completeness detection algorithm is defined as any logic for determining if production of a material is complete.

2. The material completeness detection method according to claim 1, wherein in the step of acquiring a material completeness detection result of the target object based on the first detection result and the second detection result:
   when either of the first detection result and the second detection result indicates that the materials of the target object are incomplete, the material completeness detection result comprises that the materials of the target object are incomplete; and
   when both the first detection result and the second detection result indicate that the materials of the target object are complete, the material completeness detection result comprises that the materials of the target object are complete.

3. The material completeness detection method according to claim 2, further comprising:
   controlling the physical production line to transfer the target object to an unqualified zone when the material completeness detection result comprises that the materials of the target object are incomplete; and
   controlling the physical production line to convey the target object to a next process when the material completeness detection result comprises that the materials of the target object are complete.

4. The material completeness detection method according to claim 2,
   wherein when the material completeness detection result comprises that the materials of the target object are incomplete, the material completeness detection result further comprises a type and/or a position of a missing material.

5. The material completeness detection method according to claim 1, wherein the enhanced feature extraction network generates the 160*160*128 enhanced feature layer by:
   performing the following operations on the 20*20 feature layer in sequence: up-sampling, connection with the 40*40 feature layer, feature extraction, up-sampling, connection with the 80*80 feature layer, feature extraction, up-sampling, connection with the 160*160 feature layer, and feature extraction.

6. The material completeness detection method according to claim 1, further comprising:
   establishing a three-dimensional (3D) model of the physical production line and the materials in advance, and generating the DT of the physical production line according to the established 3D model.

7. The material completeness detection method according to claim 1, further comprising:
   displaying the virtual production line and the material completeness detection result in a graphical user interface (GUI).

* * * * *